US00RE38619E1

(19) United States
(12) Reissued Patent
Paratore et al.

(10) Patent Number: US RE38,619 E
(45) Date of Reissued Patent: Oct. 12, 2004

(54) METHOD AND APPARATUS FOR SUPPORTING TDMA OPERATING OVER HYBRID FIBER COAXIAL (HFC) OR OTHER CHANNELS

(75) Inventors: Bernardo Paratore, Doylestown, PA (US); Robert Patrick Mullins, Eagleville, PA (US); Michael J. Gittings, Moorestown, NJ (US); Dennis R. Clark, South Hampton, PA (US)

(73) Assignee: General Instrument Corporation, Horsham, PA (US)

(21) Appl. No.: 09/360,100

(22) Filed: Jul. 23, 1999

Related U.S. Patent Documents

Reissue of:
(64) Patent No.: 5,666,358
Issued: Sep. 9, 1997
Appl. No.: 08/543,702
Filed: Oct. 16, 1995

(51) Int. Cl.[7] ..... H04J 3/16
(52) U.S. Cl. ..... 370/347; 370/503
(58) Field of Search ..... 370/319, 321, 370/337, 347, 346, 350, 349, 389, 421, 458, 503, 509, 508, 512, 515, 516, 518, 519, 442, 441, 507, 510, 511, 513, 335

(56) References Cited

U.S. PATENT DOCUMENTS

| | | | | |
|---|---|---|---|---|
| 4,697,263 A | * | 9/1987 | Beaufoy | 370/85 |
| 4,768,188 A | | 8/1988 | Barnhart et al. | 370/80 |
| 4,873,663 A | * | 10/1989 | Baranyai et al. | 370/503 |
| 4,888,769 A | * | 12/1989 | Deal | 370/50 |

(List continued on next page.)

FOREIGN PATENT DOCUMENTS

| | | | |
|---|---|---|---|
| EP | 0548381 A1 | 6/1993 | G06F/1/14 |
| EP | 0740431 A1 | 10/1996 | H04B/7/26 |
| JP | 6046079 | 2/1994 | |
| JP | 6046080 | 2/1994 | |
| JP | 6252953 | 9/1994 | |
| JP | 6343065 | 12/1994 | H04J/2/22 |
| JP | 7066814 | 3/1995 | |
| JP | 9064892 | 3/1997 | |

OTHER PUBLICATIONS

Ohta, et al., A Study On The ATM Interface Of Satellite TDMA Systems for B–ISDN Application, (Oct. 1992) Technical Report of IEICE, SAT92–52, CS92–58.

*Primary Examiner*—Dang Ton
(74) *Attorney, Agent, or Firm*—Volpe and Koenig, P.C.

(57) ABSTRACT

In a Time Division Multiple Access (TDMA) communication network, a central office (CO) provides interactive communication between a service provider and a plurality of user terminals. To synchronize transmissions of the user terminals, a timebase timer in the CO generates modulo N-bit cyclical reference counts as time markers. In a downstream direction to the plurality of user terminals, time marker insertion units in the CO receive both (a) separate digital TDMA transport streams having a predetermined data rate including data packets and Media Access Control (MAC) packets that are interspersed between the data packets at predetermined intervals, and (b) the time markers generated by the timebase timer, and insert a currently received time marker count into a concurrently received MAC packet. The resultant downstream TDMA transport streams with the inserted time marker counts in the MAC packets are transmitted in continuous TDMA output transport stream to the remote user terminals. The time markers are independent of a data rate, a physical channel, and a channel protocol of the transport stream. In each user terminal, a network interface module synchronizes itself by comparing received time markers and locally generated time marker counts for correcting a local oscillator frequency. Upstream channel units in the CO are synchronized using the timebase timer generated time markers for receiving and processing upstream data packets upon arrival at their preassigned channel unit.

34 Claims, 3 Drawing Sheets

U.S. PATENT DOCUMENTS 5,138,635 A * 8/1992 Ballance ..... 375/107
5,353,285 A * 10/1994 Plas et al. ..... 370/84
5,363,375 A * 11/1994 Chuang et al. ..... 370/95.3
5,363,376 A * 11/1994 Chuang et al. ..... 370/95.3
5,408,506 A * 4/1995 Mincher et al. ..... 375/356
5,425,027 A * 6/1995 Baran ..... 370/69.1
5,428,645 A * 6/1995 Dolev et al. ..... 375/354
5,432,782 A * 7/1995 Suzuki ..... 370/60
5,442,658 A * 8/1995 Cuny et al. ..... 370/503
5,886,989 A 3/1999 Evans et al. ..... 370/347

* cited by examiner

USER 1 EQPT.
32 (1)
32 (2)
NETWORK INTERFACE MODULE
34
APPLN. MODULE
36
USER 2 EQPT
USER 3 EQPT.
32 (3)
USER 4 EQPT.
32 (4)
USER X EQPT.
32 (x)
22
CABLE PLANT
11
GEN. MOD.
46 (1)
46 (2)
46 (n)
18 (1)
18 (2)
18 (n)
44 (1)
44 (2)
44 (n)
TMIU
16 (1)
16 (2)
16 (n)
MAC MUX
42 (1)
42 (2)
42 (n)
14 (1)
14 (2)
14 (n)
12 (1)
12 (2)
12 (n)
10
20
TIMEBASE TIMER
48
51
30
NETWORK INTERFACE & CONTROL UNIT
40
55
BURST DEMOD
24 (1)
24 (n)
50 (1)
50 (n)
URTM
23 (1)
23 (n)
26 (1)
26 (n)
49 (1)
49 (n)
28
PACKET REDIRECTOR
52
54
TO/FROM SERVICE PROVIDER

METHOD AND APPARATUS FOR SUPPORTING TDMA OPERATING OVER HYBRID FIBER COAXIAL (HFC) OR OTHER CHANNELS

Matter enclosed in heavy brackets [ ] appears in the original patent but forms no part of this reissue specification; matter printed in italics indicates the additions made by reissue.

FIELD OF THE INVENTION

The present invention relates to a versatile and efficient Access Network that supports and synchronizes Time Division Multiple Access (TDMA) operation over Hybrid Fiber Coaxial (HFC) channels and/or other channels such as wireless channels.

BACKGROUND OF THE INVENTION

In an interactive communication system, a plurality of users or subscribers of the system are located in a predetermined region and are provided with the capability of interacting with their television, personal computer, etc. More particularly, the users are connected via a cable plant in a tree-like structure to equipment in a Central Office. Various formats can be used to permit the plurality of users to share the resources of the cable plant and the Central Office equipment. One of such [format is the] *formats in* use, for example, *is* Frequency Time Division Multiple Access (FTDMA).

U.S. Pat. No. 5,138,635(Ballance), issued on Aug. 11, 1992, discloses a technique for clock synchronization in a communications network. The network comprises a central exchange comprising a master clock, and a plurality of remote subscriber stations that are connected to the central exchange and communicate via data cells with the central exchange. The subscriber stations are arranged to recover a master clock frequency from data received from the central exchange, and to transmit data to the central exchange at that master clock frequency. The central exchange comprises (a) a delay line arranged to receive incoming data cells, (b) means for sampling data from different taps of the delay line, and (c) means for determining from the sampled data which tap of the delay line carries data optimally in phase with the master clock and for selecting that data for outputting a data cell accordingly. Therefore, the central exchange uses a single clock, but instead of attempting to recover an appropriate clock for the incoming data, the central exchange uses a delay line to provide a progressive delay for the incoming data via the delay line, and then identifies the tap from the delay line which carries the incoming data having a phase appropriate to the master clock. In this manner, the central exchange handles data transmitted from subscriber stations with a phase that varies arbitrarily with respect to the system master clock.

U.S. Pat. No. 5,425,027 (Baran), issued on Jun. 13, 1995, discloses a wide area fiber and TV cable fast packet cell network. The fiber portion of the network bidirectionally transmits Asynchronous Transfer Mode (ATM) compliant cells over a digital optical fiber path from a head end unit to interconnect a subscriber interface units (SIU) for supporting two-way digital services with a coaxial feeder cable TV system, where the TV and digital signals are transmitted at different frequency bands. At the subscriber terminals, the TV and digital signals are filtered and separately processed. Each SIU sends and receives a UHF signal that is converted to and from a digital signal, respectively, for conveying the ATM cells. Each ATM cell contains a local address of the source and destination of that cell, and the SIU only accepts those cells addressed to it. A capacity assignment and polling arrangement from a Fiber Terminating Unit (FTU) at the head end is used. More particularly, the FTU initially measures the round trip transmit time of signals sent to each SIU. Each SIU is assigned to predetermined number of cells for transmission purposes which is monitored during transmissions and dynamically changed as required for most efficient use of the transmission medium. Timing for control of The SIUs uses bit timing of a constant bit stream of the cells emanating from the FTU, where each SIU locks a local oscillator to this bit rate to control the output cells of the SIU. This same timing source also provides the frequency reference for the receive section of each SIU. Thus the FTU and SIUs are essentially locked together with known measured transit time offsets.

U.S. Pat. No. 5,428,645 (Dolev et al.), issued on Jun. 27, 1995, discloses a technique for synchronizing a local time maintained at a node within a network architecture with a reference time. A burst, including a series of "k" synchronizing messages, is sent from a master node to remote slave nodes, where each synchronizing message includes a reference time stamp based on a reference time provided to the master node by a remote time source. The slave nodes synchronize themselves by first extending a local time according to the slave node's reckoning which corresponds with the reference time determined in relation to the time stamps contained within the received synchronization messages. More particularly, the technique determines that a first time according to a first time scale falls between second and third times according to a second time scale. The times are selected based on synchronizing messages sent in a burst from a repository of one of the scales (i.e., the reference time) bearing reference time stamps according to a reference time scale. These synchronizing messages are received by a local time repository, such as a slave node, which associates local time stamps according to the other time scale (i.e., a local time scale). Because of the protocol of the synchronizing messages, temporal relationships are determined between the local time stamps and the reference time stamps within the messages of a burst. These first, second, and third times are identified at the slave node based only on the synchronizing messages received within a burst. After the first, second, and third times are identified, a time is selected in relation to the second and third times, preferably halfway between them, and a difference is determined between the selected time and the third time. Finally, the local time is updated to compensate for such difference and is allegedly accurate to within half of the distance between the second and third times.

A problem exists in a Time Division Multiple Access (TDMA) communication access network of how to synchronize all of the plurality of remote users arranged in a tree-type architecture that may communicate with central office equipment using channels which may have different protocols so that all of the users have a common reference and know which frequency (channel), frame length, and number of time slot(s) they are to transmit on while operating with sufficient robustness and obtaining a shared allocation of the available resources. Synchronization of the plurality of users should be accomplished by distributing a time reference which is independent of a data rate, a physical channel, and a channel coding that is used in order to operate with any of the channel parameters that are now available for use or may become available for use in the future.

SUMMARY OF THE INVENTION

The present invention is directed to method and apparatus that supports and synchronizes Time Division Multiple Access (TDMA) operation over hybrid Fiber Coaxial (HFC) channels and/or wireless channels. More particularly, the present invention is directed to a technique for implementing a synchronization of a plurality of user equipments from a head end office using a TDMA format by distributing a time reference which is independent of the data rate, the physical channel, and the channel coding used.

Viewed from one aspect, the present invention is directed to a Time Division Multiple Access (TDMA) communication network comprising downstream channel synchronizing means comprising a timebase timer and at least one time marker insertion means. The timebase timer generators time markers comprising modulo N-bit programmable cyclical reference counts that are incremented at a predetermined frequency and are reset to 0 when the count reaches a [redefined] *predefined* value. Each of the at least one time marker insertion means comprises first and second input terminals, and an output terminal. The first input terminal receives a digital TDMA transport stream having a predetermined data rate including data packets and Media Access Control (MAC) packets that are interposed at predetermined intervals between the data packets. The second input terminal receives the time markers generated by the timebase timer and inserts a currently received time marker count into a currently received MAC packet. The output terminal transmits the received TDMA data stream with the inserted time marker counts in the MAC packets in a continuous output data stream to remote user terminals where the time markers are independent of a data rate, a physical channel, and a channel protocol of the transport stream and are used for synchronizing the user terminals.

Viewed from another aspect, the present invention is directed to a Time Division Multiple Access (TDMA) communication network comprising downstream channel synchronizing means comprising a timebase timer and a plurality of time marker insertion means. The timebase timer generates time markers comprising modulo N-bit programmable cyclical reference counts that are incremented at a predetermined frequency and are reset to 0 when the count reaches a [redefined] *predefined* value. Each time marker insertion means comprised first and second input terminals, and an output terminal. The first input terminal receives a digital TDMA transport stream having a predetermined data rate including data packets and Media Access Control (MAC) packets that are interspersed at predetermined intervals between the data packets. The second input terminal receives the time markers generated by the timebase timer and inserts a currently received time marker count into a currently received MAC packet. The output terminal transmits the received TDMA data stream with the inserted time marker counts in the MAC packets in a continuous output data stream to remote user terminals where the time markers are independent of a data rate, a physical channel, and a channel protocol of the transport stream and are used for synchronizing the user terminals, where two of the time marker insertion means receive digital TDMA transport streams having different predetermined data rates.

Viewed from still another aspect, the present invention is directed to a method of synchronizing communications with a plurality of remote user terminals in a TDMA communication network. In a first step, [generating] a time marker sequence is generated comprising modulo N-bit programmable cyclical reference counts that are incremented at a predetermined frequency and are reset to 0 when the count reaches a predefined value in a timebase timer. In a second step, at least one downstream Time Division Multiple Access (TDMA) transport stream is received, where each transport stream comprises a predetermined frequency including data packets and Media Access Control (MAC) packets that are interspersed at predetermined intervals between the data packets. In a third step, a currently received time marker count generated in the first step is inserted into *a* currently received MAC packet in the second step in a time marker insertion means, and the received at least one TDMA data stream with the inserted time marker counts in the MAC packets is transmitted in a continuous output downstream data stream to remote user terminals, where the time markers in the downstream data stream are independent of a data rate, a physical channel, and a channel protocol of the downstream transport stream and are used by the plurality of user terminals for synchronizing upstream data transmissions.

The invention will be better understood from the following more detailed description taken with the accompanying drawings.

DETAILED DESCRIPTION

It is to be understood that corresponding elements performing the same function in each of the figures have been given the same designations number.

Figure 1:
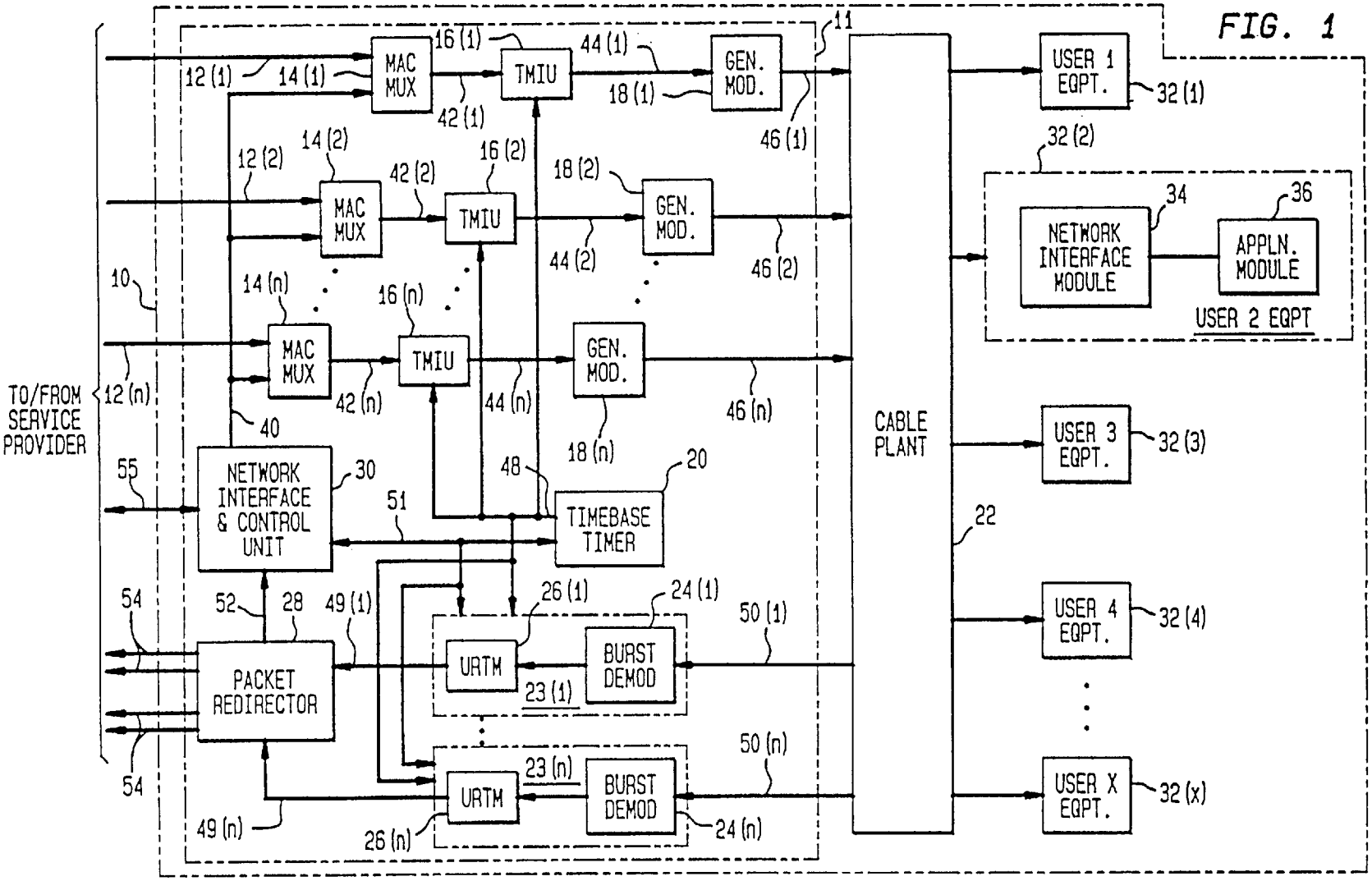
FIG. 1 is a block diagram of a Time Division Multiple Access (TDMA) communication network in accordance with the present invention.

Referring now to FIG. 1, there is shown a block diagram of an access network 10 (shown within a dashed line rectangle) in accordance with the present invention. The access network 10 comprises central office equipment 11 (shown within a dashed line rectangle) that is connected on a first side to a Service Provider (not shown), a cable plant 22 coupled to a second side of the central office equipment [10] *11*, and a plurality of user or subscriber terminals 32(1)–32(x) coupled to the cable plant 22.

The central office equipment 11 comprises a plurality of Media Access Control Multiplexers (MAC MUX) 14(1)–14(n), a plurality of Time Marker Insertion Units (TMIU) or means 16(1)–16(n), a plurality of Generic Modulators (GEN.MOD.) 18(1)–18(n), a Timebase Timer 20, a plurality of upstream channels 23(1)–23(n) comprising Burst Demodulators (BURST DEMOD) 24(1)–24(n), respectively, and respective Upstream Real Time Processing Module (URTM) units 26(1)–26(n), a Packet Redirector 28, and a Network Interface and Control Unit 30. In a downstream portion of the Central Office equipment 11 going from the remote Service Provider to the User Terminals 32(1)–32(x), the MAC MUXs 14(1)–14(n) receive separate data streams at first inputs from the remote Service Provider via leads 12(1)–12(n), respectively, and signals from the Network Interface and Control Unit 30 at second inputs via a common lead 40. Outputs from the MAC MUXs 14(1)–14(n) are coupled to first inputs of the TMIUs 16(1)–16(n), respectively, via respective leads 42(1)–42(n). The Timebase Timer 20 is [couple] *coupled* to second inputs of the TMIUs 16(1)–16(n) via a common lead 48. Outputs [puts] from the TMIUs 16(1)–16(n) are coupled to inputs of the Generic Modulators (GEN MOD) 18(1)–18(n), respectively, via respective leads 44(1)–44(n). Outputs from the GEN MODs 18(1)–18(n) are coupled to the cable plant 22 for transmission to inputs of the plurality of User Terminals 32(1)–32(x).

In an upstream portion of the Central Office equipment 11 going from the User Terminals 32(1)–32(x) to the remote Service Provider, the User Terminals 32(1)–32(x) transmit message bursts via the cable plant 22 to the Central Office equipment 11 where they are received at predetermined channel units 23(1)–23(n). More particularly, the channels units 23(1)–23(n) comprise Burst Demodulators 24(1)–24(n) and Upstream Real Time Processing Modules (URTM) 26(1)–26(n), respectively. The cable plant 22 is coupled to inputs of the Burst Demodulators 24(1)–24(n) via leads 50(1)–50(n), respectively, and outputs of the Burst Demodulators 24(1)–24(n) are coupled to inputs of the URTMs, respectively. Outputs from the URTMS 26(1)–26(n) are coupled to inputs of the Packet Redirector 28 via leads 49(1)–49(n), respectively, and the Packet Redirector 28 transmits signals to the remote Service Provider on output channels 54. The Network Interface and Control Unit 30 receives upstream control path information from the Packet Redirector 28 via conductor 52, and the Timebase Timer 20 interchanges information with the channel units 23(1)–23(n) and the Network Interface and Control Unit 30 via bus 51.

In operation, the MAC MUXs 14(1)–14(n) receive pure digital data streams at first inputs from a remote Service Provider via leads 12(1)–12(n), respectively, and Media Access Control (MAC) messages that are generated by the Network Interface and Control Unit 30 at second inputs via bus 40. The pure data signals received by the MAC MUXs 12(1)–12(n) from the remote Service Provider can comprise any suitable data streams as, for example, Moving Picture Expert Group-2 (MPEG-2) or Asynchronous Transfer Mode (ATM) standard data streams having any suitable predetermined data rates. The MAC messages are provided by the Network Interface and Control Unit 30 at a substantial periodic rate to the MAC MUXs 14(1)–14(n), and comprise, for example, an empty packet or a packet containing predetermined control information for transmission to the User Terminals 32(1)–32(x). Each of the MAC MUXs 14(1)–14(n) multiplexes the received data stream from the remote Service Provider with the MAC messages provided by the Network Interface and Control Unit 30 to generate a TDMA output data stream at a predetermined data rate. It is to be understood that certain one or more of the MAC MUXs 14(1)–14(n) can have Output data streams at a first predetermined data rate, other one or more of the MAC MUXs 14(1)–14(n) can have output data streams at a second predetermined data rate, and still other one or more of the MAC MUXs 14(1)–14(n) can have output data streams at a third predetermined data rate, etc, to accommodate the services that are provided to the User Terminals 32(1)–32(x).

The multiplexed output data streams from the MAC MUXs 14(1)–14(n) are received at first inputs of the Time Marker Insertion Units (TMIUs) or means 16(1)–16(n), respectively, via respective [lead] *leads* 42(1)–42(n). Still further, the TMIUs 16(1)–16(n) receive Timebase Markers (TMS) at second input from the Timebase Marker 20 via a common lead 48. Each one of the TMIUs 16(1)–16(n) detects the arrival of an empty MAC [messages] *message* in the received multiplexed data stream from the associated MAC MUX 14(1)–14(n), and inserts a Timebase Marker therein.

Figure 2:
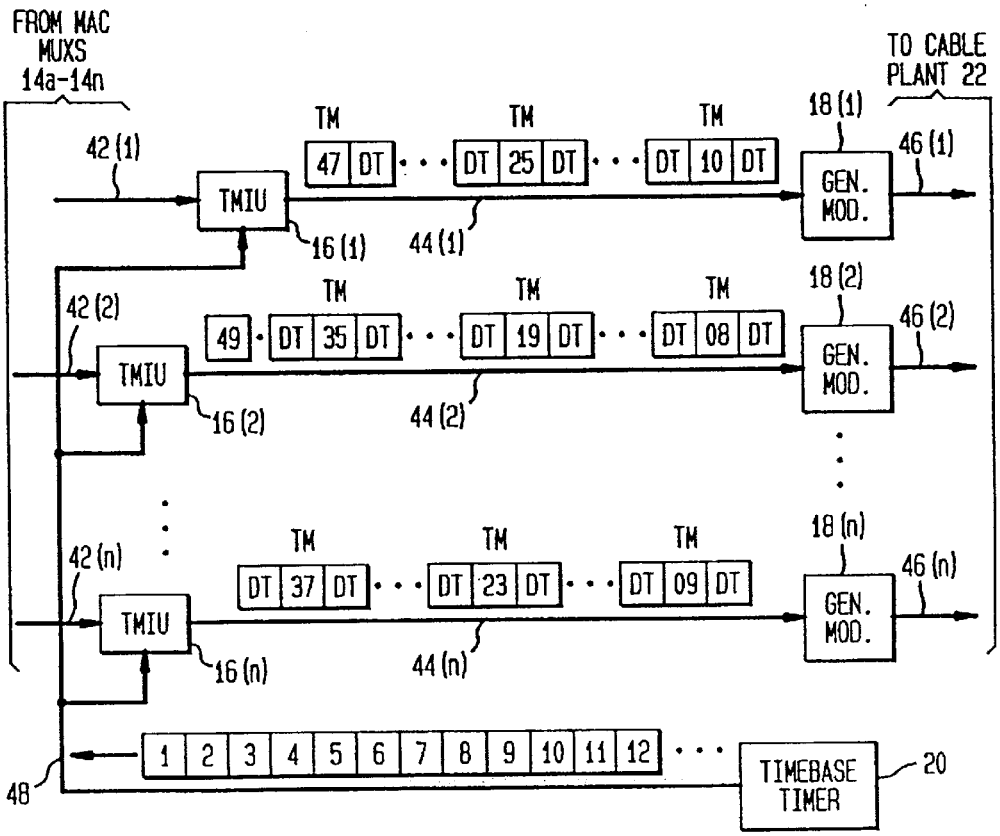
FIG. 2 is a partial view of the TDMA communication network of FIG. 1 showing exemplary data transport streams including exemplary [Time Markers] *time markers* inserted therein in accordance with the present invention.

Referring now to FIG. 2, there is shown a partial view of the TDMA communication network 10 of FIG. 1 comprising the TMIUs 16(1)–16(n), the Generic Modulators (GEN MOD) 18(1)–18(n), and the Timebase Timer 20 to illustrate the operation of the TMIUs 16(1)–16(n) in accordance with the present invention. The Timebase Marker 20 can comprise any suitable generating unit that generates modulo N output Time Markers or Time Stamps at a predetermined rate. For example, the Timebase Timer 20 can comprise a local stable clock (not shown) or a Stratum clock source (not shown) that drives a programmable modulo N counter (not shown). In turn, the modulo N counter generates Time Markers which are distributed to the TMIUs 16(1)–16(n) via lead 48. More particularly, the Timebase Timer 20 generates an N-bit (e.g., 32 bit) programmable reference count that is incremented at a frequency (e.g., 1024 Mhz with 1 ppm stability) and is reset to 0 when the count reaches a predefined value. The Timebase Timer 20 optionally can support Time-Of-Day functionality, and broadcast the Time-Of-Day in conjunction with the Time Markers.

More particularly, the Timebase Timer 20 generates a sequence of Time [Marker] *Markers* comprising a series of cyclical modulo N numbers from 0 to modulo N (of which only Time [Marker] *Markers* 1–12 are shown in FIG. 2) at a predetermined time marker rate. The Time Markers are transmitted via lead 48 to the TMIUs 16(1)–16(n). The TMIUs 16(1)–16(n) detect the occurrence of special timebase MAC Messages (e.g., empty MAC messages) that were inserted into the data streams by the MAC MUXs 14(1)–14(n), respectively, and received via respective leads 42(1)–42(n). Upon detection of a special timebase MAC [Messages] *Message*, each TMIU *16(1)–16(n)* inserts the current Time Marker modulo N number being received on lead 48 into that special timebase MAC Message. For example, as is shown in the output data stream from TMIU 16(1) on lead 44(1), the Time Markers (TM) 10, 25, and 47 have been inserted into the special timebase MAC Message packets occurring between the sequential data packets (DT) received from the MAC MUX 14(1) via lead 42(1). Still further, as is shown in the output data stream from TMIU 16(2) on lead 44(2), the Time Markers (TM) 08, 19, [25] *35*, and 49 have been inserted into the special timebase MAC Message packets occurring between the sequential data packets (DT) received from the MAC MUX 14(2) via lead [42(20] *42(20)*. Additionally, as is shown in the output data stream from TMIU 16(n) on lead 44(n), the Time Markers (TM)09, 23, and 37 have been inserted into the special timebase MAC Message packets occurring between the sequential data packets (DT) received from the MAC MUX 14(n) via lead 42(n). It is to be understood that the special timebase MAC Message packets occur at a rate which is adequate to cancel out any drift of a local time base modulo N counter in a Network Interface Module 34 of a user terminal (e.g., User Terminal 32(2) shown in FIG. 1). The insertion of Time Markers by the TMIUs 16(1)–16(n) occurs in real time, and the actual Time Marker value is adjusted to take into account any queueing delay of special timebase MAC message.

Returning now to FIG. 1, the output data streams from the TMIUs 16(1)–16(n) are received by Generic Modulators (GEN MOD) 18(1)–18(n), respectively, via respective leads 44(1)–44(n). The GEN MODs 18(1)–18(n) transform the digital bit streams received via leads 44(1)–44(n), respectively, into analog Radio Frequency (RF) signals for efficient transmission over the cable plant 22 to the User Terminate 32(1)–32(x). As was stated hereinbefore, certain one or more of output data streams from the MAC MUXs 14(1)–14(n) can have a first predetermined data rate, other one or more of the output data streams from the MAC MUXs 14(1)–14(n) can have a second predetermined data rate, and still other one or more of the output data streams from the MAC MUXs 14(1)–14(n) can have a third predetermined data rate, etc, to accommodate the services that are provided to the User Terminals 32(1)–32(x). For purposes of illustration, it is assumed hereinafter that GEN MOD 18(1) receives a digital bit stream at a 27 Mbit/sec, data rate and generates an output analog data stream using 64 Quadrature Amplitude Modulation (QAM), GEN M0D 18(2) receives a digital bit stream at a 2 Mbit/sec, data rate and generates an output analog data stream using Quadrature Phase Shift Keying (QPSK), and GEN M0D 18(n) receives a digital bit stream at a 64 Kbit/sec., data rate and generates an output analog data stream using, for example, Frequency Shift Keying (FSK). It is to be understood that the present invention provides the ability to transmit Time Marker messages in any type of transport data stream having any specific data rate. This provides a robustness in the network 10 that permits any present or future data rate transport data stream to be accommodated and permits User Terminals 32(1)–32(x) to be synchronized in a TDMA tree-type architecture with a common timing reference which is independent of the data rate, the physical channel, and the channel coding of transport stream protocol.

The User Terminals 32(1)–32(x) can comprise any suitable device such as a Digital Cable Terminal (DCT), a personal computer, etc. User Terminal 32(2) illustrates a typical user terminal comprising a Network Interface Module (NIM) 34 and an Applications Module (APPLN MODULE) 36. The NIM 34 provides network services to the Application Module 36, and comprises transmission elements (not shown) such as tuners, modems, error correction devices, access control elements (not shown), and network access and application interface equipments (not shown). In accordance with the present invention, the NIM 34 further comprises means for synchronizing the User Terminals 32(2) to the Time Markers received in one or more of the data streams from the cable plant 22.

Figure 3:
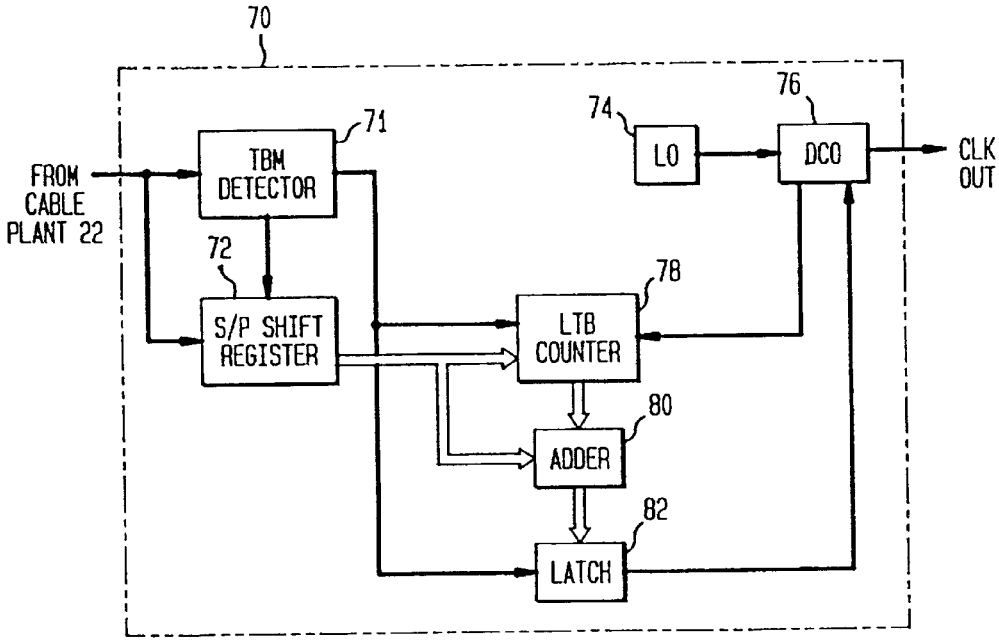
FIG. 3 is a block diagrams of a Network Interface Module for synchronizing a user or subscriber terminal to time markers in a received data transport stream in accordance with the present invention.

Referring now to FIG. 3, there is shown a block diagram of a synchronizing device 70 (shown within a dashed line rectangle) forming part of a Network Interface Module 34 (shown in FIG. 1) for synchronizing a User Terminal [e.g., User Terminal 32(2)] to Time Markers in a received data stream in accordance with the present invention. The synchronizing device 70 comprises a Timebase Marker Detector (TBM DETECTOR) 71, A Serial-To-Parallel Shift Register (S/P SHIFT REGISTER) 72, A Local Oscillator (LO) 74, a Digitally Controlled Oscillator (DCO) 76, a Local Time Base Counter (LTB) 78, an Adder 80, and a Latch 82. Structurally, inputs of the TBM Detector 71 and the S/P Shift Register 72 are coupled to the Cable Plant 22. A first output from the TBM Detector 71 is coupled to one input of each of the LTB 78 and the Latch 82, and a second output from the TBM Detector 71 is coupled to a second input of the S/P Shift Register 72. An output from the S/P Shift Register 72 is coupled to a second input of the LTB Counter 78 and to an input of the Adder 80. An output of the LO 74 is coupled to a first input of the DC0 76. An output from the Latch 82 is coupled to a second input of the DCO 76. First and second outputs of the DCO 76 are coupled to a third input of the LTB Counter 78 and a clock (CLK) output from the synchronizing device 70, respectively. An output of the LTB Counter 78 is coupled to a second input of the Adder 80. An output of the Adder 80 is coupled to a second input of the Latch 82.

In operation, the Local Oscillator (LO) 74 generates clock sequence pulses at a predetermined frequency, and the DCO 76 is initially operated at a fixed division of the frequency of the LO 74. The output from the DC0 76 is at an initial predetermined Local Time Base clock frequency and is transmitted to an input of the Local Time Base Counter 78. Each pulse of the Local Time Base clock from the DC0 76 increments the Local Time Base Counter 78 by one.

The TBM Detector 71 and the S/P Shift Register 72 each receive a channel data stream from the cable plant 22. The TBM Detector 71 detects each of Time Marker messages in the received channel data stream from cable plant 22, and generates a strobe output signal to the Local Time Base (LTB) counter 78 and the Latch 82, and an enable control signal to the S/P Shift Register 72. The S/P Shift Register 72 receives the data stream and, in response to the enable control signal from the TBM Detector 71, stores and converts the serially received modulo N Time Marker in the received data stream into a parallel output signal for transmission to the LTB Counter 78 and the Adder 80. The parallel output signal from the S/P Shift Register 72 contains the Time Base modulo N Count in the most recent Time Marker message received in the data stream from the cable plant 22.

The strobe output signal from the TBM Detector 71 causes a current count comprising a previously stored Time Marker count in the LTB Counter 78 plus any interim count added thereto by the output from the DCO 76 to be outputted to the Adder 80. Concurrent therewith, the currently received Time Marker count in the S/P Shift Register 72 is entered into the LTB Counter 78 and the Adder 80. The Adder 80 subtracts the modulo N number in the currently received Time Marker count from the S/P Shift Register 72 from the Time Marker count output from the LTB Counter 78. The output signal from the Adder 80 represents an error count between the two input count signals which is latched into the Latch 82. An error count output signal from the Latch 82 is transmitted to the DCO 76 which is responsive to the error count signal to correct the DC0 output frequency in a direction that decreases any error to more closely track the Timer Marker counts received from the Central Office equipment 11. This process is repeated with the detection of each Time Marker message received by the TBM Detector 71 and S/P Shift Register 72 until a locked condition is determined.

For example, if it is assumed that all of the User Terminals 32(1)–32(x) receive the same sequence of Time Markers of 10, 25, 47, etc. [as shown at the output of the TMIU 16(1) in FIG. 2], the operation of each User Terminal 32(1)–32(x) can be described as follows. Each User Terminal 32(1)–32 (x) first receives, detects, and stores the current Time Marker count of "10" in its LTB Counter 78 and starts counting from "10" in response to sequential clock pulses from the DC0 76. With the subsequent reception and detection of the Time Marker number "25" in the data stream from the cable plant 22, the number "25" is effectively compared with a count number (e.g., a number "28") currently found in the LTB Counter 78. More particularly, the number "28" occurred in the LTB Counter 78 because the clock pulses from the DC0 76 had a slightly faster rate than the Time Marker counts generated by the Timebase Timer 20 shown in FIG. 1. The comparison between the two numbers is effectively performed by subtracting the currently received Time Marker number "25" from the S/P Shift Register 72 from the number "28" from the LTB Counter 78. A difference of "+3" between the two Time Marker numbers is the resultant error which is transmitted to the DC0 76. The DCO 76 is responsive to a "+3" error signal to slightly decrease the frequency of the output clock pulses to the LTB Counter 78. With the subsequent reception of the current Time Marker number "47", the number "47" is effectively compared with a count number (e.g., a number "45") currently in the LTB Counter 78. Such comparisons is effectively performed by subtracting the currently received Time Marker number "47" from the S/P Shift Register 72 from the number "45" from the LTB Counter 78. A difference of "−2" between the two Time Marker numbers is the resultant error which is transmitted to the DCO 76. The DC0 76 is responsive to a "−2" error signal to slightly increase the frequency of the output clock pulses to the LTB Counter 78. Such process continues until the DC0 output is declared in a "locked" condition. It is to be understood that in actually each one of the User Terminals 32(1)–32(x) synchronizes itself using the markers found in one or more of the transport streams propagating on the cable plate 22. For example, User Terminals 32(2) and 32(4) may use the Time Markers 10, 25, 47, etc. found in the transport stream from General Modulator (18)(1) (shown in FIG. 2), User Terminals 32(1) and 32(3) may use the Time Markers 08, 19, 35, 49, etc. found in the transport stream from General Modulator 18(2) (shown in FIG. 2), and User Terminal 32(x) may use the Timer Markers 09, 23, 37, etc. found in the transport stream from General Modulator 18(n) (shown in FIG. 2).

It is to be understood that the DCO 76 can comprise any suitable device. For example, a programmable counter (not shown) that inserts or removes cycles from the Local Oscillator 74 to a clock on a binary counter can be used. Alternatively, a Direct Digital Synthesis (DDS) device (not shown) can be used to generate a locked local clock. This alternative technique uses a phase accumulator (not shown) and an offset register/adder (not shown) with no lookup table and square wave generation. In either arrangement of the DC076, to avoid a long term training of a Phase Lock Loop (PLL), an accurate estimate of the frequency error (1/Error Count) is required. Ideally, it is desired to distribute a correction for this error linearly across a next time interval. This results in a final error of less than one Local Time Base Counter 78 clock cycle. Once a User Terminal [e.g., 32(1)] is locked in synchronization with the downstream Time Markers, the User Terminal can request interactive service requests via upstream communications.

Returning now to FIG. 1, in an upstream direction from the User Terminals 32(1)–32(x) to the remote Service Provider, to initiate any upstream communication from the user Terminals 32(1)–32(x) to the Central Office equipments 11 and the remote Service Provide, a User Terminal [e.g., 32(2)] transmits a interactive service requests via the cable plant 22 and a default or predetermined upstream channel [e.g., channel 23(1)] to the Network Interface and Control Unit 30. The Network Interface and Control Unit 30 manages the underlying physical cable plant 22 on behalf of an external Network Management Entity (not shown). Bandwidth utilization in the cable plant 22 is substantially maximized over the space (nodes in a tree-type architecture), frequency (RF carriers), and time (TDM) domains. In response to a service request from a remote User Terminal, the Network Interface and Control Unit 30 dynamically assigns an upstream channel to the User Terminal requesting the interactive service request for subsequent communications. More particularly, the Network Interface and Control Unit 30 assigns a channel frequency, a frame length, and a number of time slots (packets) for upstream transmission to the User Terminal for its communication with the remote Service Provider. This information is transmitted to the User Terminal via a MAC message provided to the MAC MUXS 14(1)–14(n) in the downstream direction. Once set up, the User Terminal communicates with the remote Service Provider using the assigned channel frequency, frame length, and time slots in the upstream transmission direction.

The plurality of upstream channels 23(1)–23(n) in the Central Office equipment 11 [comprise] *comprises* Burst Demodulators 24(1)–24(n), respectively, and respective Upstream Real Time Modules (URTMs) 26(1)–26(n) in sequence. The Burst Demodulators 24(1)–24(n) function in a reverse manner from the GEN MODs 18(1)–18(n) to recover digital bit stream bursts from Radio Frequency (RF) or Intermediate Frequency (IF) modulated carriers from the User Terminals 32(1)–32(x). In addition, the Burst Demodulators 24(1)–24(n) measure the signal power of each burst propagating therethrough, and both append a byte to the burst containing the signal power measurement of the burst and use the power measurements to perform power control functions. The Burst Demodulators 24(1)–24(n) can optionally measure burst arrival times relative to an [Aperture] *aperture* control signal received from the URTMs 26(1)–26 (n), respectively, in units, of symbol time, and attach a burst arrival time measurement, for example, to the tail (end) of the burst after the signal power measurement byte. Alternatively, an external entity (not shown) can perform the burst arrival timing measurements relative to the [Aperture] *aperture* control signal. For optimal performance, the [Aperture] *aperture* control signal is used to enable burst demodulation operation while operating in the TDMA environment. Enabling the Burst Demodulators 24(1)–24(n) around an expected window of each burst received in a Burst Demodulator decreases the probability of a false burst detection.

Figure 4:
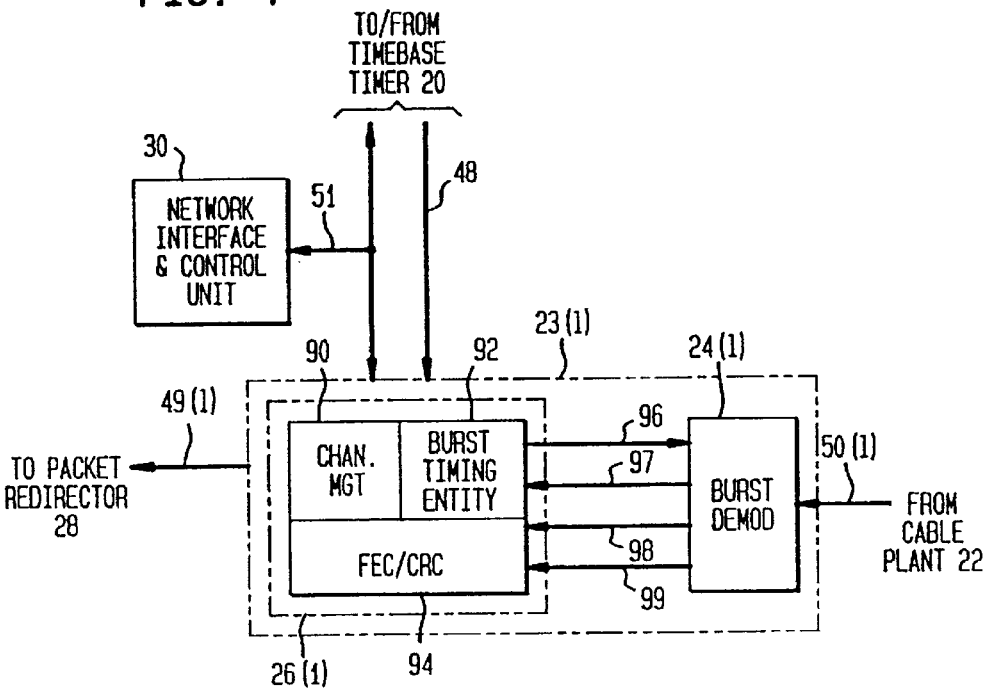
FIG. 4 is a block diagram of an upstream [Channel] *channel* in accordance with the present invention.

Referring now to FIG. 4, there is shown a block diagram of an upstream [Channel] *channel* 23(1) which operates with a Network Interface and Control Unit 30 and a Timebase Timer 20 (shown in FIG. 1) in accordance with the present invention. It is to be understood that each of the other upstream channels 23(2)–23(n) (shown in FIG. 1) have corresponding block diagrams to that shown in FIG. 4 and function with the Network Interface and Control Unit 30 and the Timebase Timer 20 in the same way. The upstream [Channel] *channel* 23(1) comprises an Upstream Real Time Processing Module (URTM) unit 26(1) and a Burst Demodulator (BURST DEMOD) 24(1). The URTM 26(1) comprises a Channel Management (CHAN MGT) Unit 90, a Burst Timing Entity 92, and a Forward Error Correction/Cyclic Redundancy Check (FEC/CRC) Unit 94. Within the Channel Unit 23(1), the Burst Timing Entity 92 sends [Aperture] *aperture* control signals to the Bust Demod 24(1) via conductor 96, and receives Burst Detect signals from the Burst Demod 24(1) via lead 97. The Burst Demod 24(1) also transmits "receive data" and "receive clock" signals to the FEC/CRC Unit 94 via leads 98 and 99, respectively. The Channel Unit 23(1) receives Timebase (TB) clock and TB Marker signals from the Timebase Timer 20 via bus 48, and RF or IF signal from the cable plant 22 via lead 50(1). More particularly, the Burst Demand 24(1) can receive RF signals directly from the cable plant 22. Alternatively, a converter (not shown) can be inserted between the cable plant 22 and the Burst Demand 24(1) for converting the received modulated RF signal from the cable plant 22 into a modulated IF signal for transmission to the Burst Demand 24(1). Still further, the Channel Unit 23(1) transmits packets (e.g., ATM packets) to the Packet Redirector 28 via lead 49(1), and interacts with the Network Interface and Control Unit 30 via bus 51 and also via lead 49(1), the Packet Redirector 28, and lead 52 (shown in FIG. 1.)

Once a User Terminal [e.g., 32(2) in FIG. 1] makes an interactive request and the Network Interface and Control Unit 30 assigns a frame length, time slots, and frequency for the User Terminal 32(2) to use via a downstream MAC message as described hereinbefore, the Network Interface and Control Unit 30 sets up in the appropriate Channel Unit [e.g., channel Unit 23(1)] by sending appropriate set up signals to the Channel Unit 23(1) via bus 51. More particularly, the Network Interface and Control Unit 30 transmits signals via bus 51 to load or configure the Channel Management Unit 90 with certain parameters as, for example, the Timing Slots and Frame parameters (how many slots/frame), etc. for the Channel Unit 23(1).

The Channel Management Unit 90 is basically a processor that controls the operation of the Burst Timing Entity 92 and the FEC/CRC unit 94. For example, the Channel Management Unit 90 keeps track of statistics for the Channel Unit 23(1) as, for example, the number of errors in each received time slot, the power levels, etc. as obtained from the FEC/CRC unit 94. The actual data packets transmitted by the Channel Management Unit 90 include locally generated statistical data on the packets in each slot which contains the average number of errors and the power level seen in each slot or packet. That information is sent to the Network Interface and Control Unit 30 in the form of, for example, an ATM packet via the Packet Redirector 28. More particularly, ATM packets transmitted by the Channel Management Unit 90 contains statistical information for the Network Interface and Control Unit 30 and are transmitted via lead 49(1) to the Packet Redirector 28 which redirects such statistical information packets to the Network Interface and Control Unit 30 via lead 52 (shown in FIG. 1).

The FEC/CRC unit 94 functions to receive data or clock packets from the Burst Demand 24(1) via leads 98 and 99, respectively, and perform either a Forward Error Check (FEC) or a Cyclic Redundancy Check (CRC), or any other desirable error checking technique on the data and clock packets. The error corrected data packets are transmitted via lead 49(1) to the Packet Redirector 28 where they are placed in a proper channel for transmitting to the remote Service Provider via leads 54 (shown in FIG. 1). More particularly, the Packet Redirector 28 determines whether a packet is a data packet to be redirected to the remote Service Provider via leads to 54, or a statistical information packet to be redirected to the Network Interface and Control Unit 30 via lead 52 by viewing differentiated codes that were entered in the header field by the FEC/CRC Unit 94 and the Channel Management Unit 90, respectively.

To accomplish synchronization in the Upstream Channel Unit 23(1), the Burst Timing Entity 92 generates in Aperture control signal for transmission via lead 96 to the Burst Demod 24(1), and receives a Burst Detect signal from the Burst Demod 24(1) via lead 97. The Burst Timing Entity 92 uses the TB Clock and TB Marker signals from the Timebase Timer via bus 48 to determine when a burst is due and to generate the Aperture control signal from the TB Clock and TB Marker signals.

Figure 5:
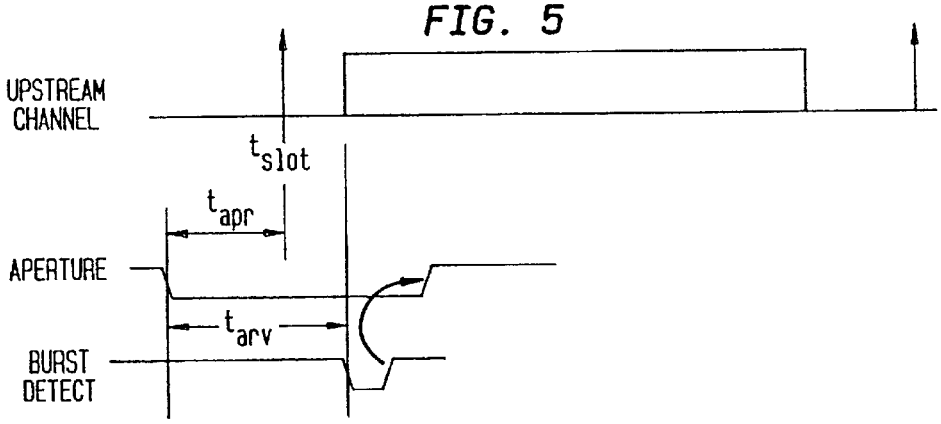
FIG. 5 is *a* timing diagram from a late burst in the upstream [Channel] *channel* of FIG. 4.
Figure 6:
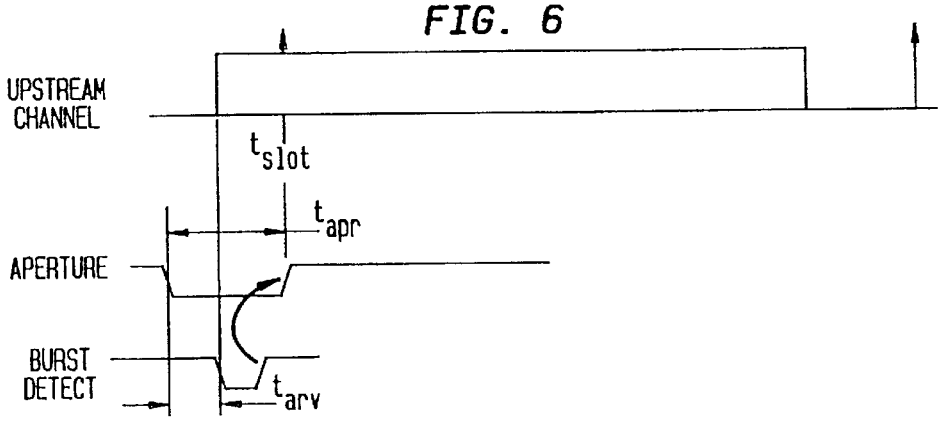
FIG. 6 is *a* timing diagram for an early burst in the upstream [Channel] *channel* of FIG. 4.

Referring now to FIGS. 5 and 6, FIG. 5 showing a timing diagram for a late burst in the upstream Channel Unit 23(1) of FIG. 4, and FIG. 6 shows a timing diagram for an early burst in the upstream Channel Unit 23(1) of FIG. 4. More particularly, the Burst Timing Unit 92 generates a time reference ($t_{slot}$) for each time slot in the form of an Aperture control signal to the Burst Demod 24(1) via lead 96, and receives a Burst Detector signal from the Burst Demod 24(1) via lead 97. The time slot ($t_{slot}$) is a function of the TB Marker signals received by the Burst Timing Entity 92 from the Timebase Timer 20 via bus 48 and the associated channel parameters loaded by the Network Interface and Control Unit 30 into the Channel Management Unit 90 via bus 51. The position of the Aperture ($t_{apr}$) signal with respect to the time slot ($t_{slot}$) signal is programmable by the Network Interface and Control Unit 30. The arrival time of the head end of a burst is shown as $t_{arv}$ in FIGS. 5 and 6. A burst arrival timing error ($t_{err}$) is defined in Equation 1 as:

$$t_{arv}=t_{apr}-t_{err}, \qquad \text{(Eq. 1)}$$

Then, if $t_{err}<0$ (as shown in FIG. 5), the burst is late, and if $t_{err}>0$ (as shown in FIG. 6, the burst is early. Normal operation requires $|t_{err}|<t_g$, where $t_g$ (not shown) is a guard time between bursts. For systems comprising elements with a negligible processing delay variation, $t_{err}$ is a correction factor that can be used by any suitable ranging algorithm. More particularly, ranging is defined as a procedure or technique used for determining a time correction required to compensate for all system timing offsets such as processing delays, channel delays, transport delays, packet jitter, and oscillator accuracy. That is necessary to optimize bandwidth in a time domain. Without ranging, a dominant factor in determining a guard time is determined by a worst case propagation delay which determines a minimum slot width $t_{slotw}$, where $$t_{slotw}=\text{Burst length}+\text{Worst Case propagation delay}, \qquad \text{(Eq. 2)}$$

It is to be appreciated and understood that the specific embodiments of the invention described hereinabove are merely illustrative of the general principle of the invention. Various modifications may be made by those skilled in the art which are consistent with the principles set forth. For example, other Time Marker formats that are independent of a data rate, a physical channel, and a channel protocol of the transport stream can be used for synchronizing the user terminals.

What is claimed is:

1. A time division multiple access (TDMA) communication network comprising:

channel synchronizing means for synchronizing channels in a downstream direction towards users of the communication network comprising:

a timebase timer for generating time markers comprising modulo N-bit programmable cyclical reference counts that are incremented at a predetermined frequency and are reset to 0 when the reference counts reach a predefined value; and at least one time marker insertion unit, each time marker insertion unit comprising a first input terminal for receiving a digital TDMA transport stream having a predetermined data rate and comprising data packets and Media Access Control (MAC) packets that are interspersed between the data packets at predetermined intervals, a second input terminal for receiving the time markers generated by the timebase timer and for inserting a currently received time marker count into a currently received MAC packet, and an output terminal for transmitting the received TDMA data stream with the inserted time marker counts in the MAC packet in a continuous output TDMA transport stream to remote user terminals where the time markers are independent of a data rate, a physical channel, and a channel protocol of the transport stream and are used for synchronizing the user terminals.

2. The TDMA communication network of claim 1 wherein the downstream channel synchronizing means further comprises at least one modulator means, each modulator means modulating the digital TDMA transport stream transmitted by a separate one of the at least one time marker insertion unit into a separation analog output TDMA transport stream having a predetermined protocol for transmission to the remote user terminals.

3. The TDMA communication network of claim 2 wherein the downstream channel synchronizing means comprises:

a plurality of time marker insertion units and two of the time marker inserting units receive digital TDMA transport streams having different predetermined data rates comprising data packets and Media Access Control (MAC) packets that are interposed between the data packets at predetermined intervals, and transmit the received TDMA transport stream with the inserted time marker counts in the MAC packets in a continuous digital output TDMA transport stream; and a plurality of modulator means wherein two of the modulator means modulate the digital TDMA transport [Streams] *stream* transmitted by a separate [ones] *one* of the plurality of time marker insertion units into a separate analog output TDMA transport streams having different pre-determined protocols for transmission to the remote user terminals.

4. The TDMA communication network of claim 1 wherein the downstream channel synchronizing means comprises a plurality of time marker insertion units, where two of the time marker insertion units receive separate digital TDMA transport streams having different predetermined data rates comprising data packets and MAC packets that are interspersed between the data packets at predetermined intervals, and transmit the received TDMA transport stream with the inserted time marker counts in the MAC packets in a continuous output TDMA transport stream to the remote user terminals.

5. The TDMA communication network of claim 4 wherein the downstream channel synchronizing means further comprises a plurality of modulator means wherein two of the modulator means modulate the digital TDMA transport stream transmitted by a separate one of the plurality of time marker insertion units into a separate analog output TDMA transport stream having different predetermined protocols for transmission to the remote user.

6. The TDMA communication network of claim 1 further comprising upstream channel synchronizing means comprising at least one upstream channel unit, where each upstream channel unit comprises a programmable real time unit for (a) storing information related to a frame length and a number of time slots arbitrarily preassigned to each user terminal that is transmitting data packets via the upstream channel unit, and (b) receiving both an upstream TDMA transport stream comprising data packets at a predetermined data rate from the remote user terminals, and the time markers comprising the modulo N-bit programmable cyclical reference counts generated by the timebase timer for synchronizing the processing of the data packets in the upstream channel unit during their time of arrival at the upstream channel unit.

7. The TDMA communication network of claim 6 wherein the each upstream channel unit in the upstream channel synchronizing means further comprises a burst demodulator for receiving both the upstream TDMA transport stream comprising data packets at a predetermined data rate directed to the upstream channel unit from the remote user terminals, and an aperture control signal from the programmable real time unit for measuring burst arrival times relative to the aperture control signal in the received upstream TDMA transport stream.

8. The TDMA communication network of claim 6 wherein the upstream channel synchronizing means comprises a plurality of upstream channel units, and at least two of the upstream channel units receive and process upstream TDMA transport streams comprising different transport data stream protocols from certain ones of the user terminals.

9. The TDMA communication network of claim 1 wherein each remote user terminal comprises a network interface module for performing network timing functions comprising:

synchronizing means for synchronizing a user terminal to time markers in a received data stream comprising:

a digitally controlled local oscillator for generating clock pulses at a preset frequency;

a counter for generating modulo N-bit programmable cyclical local oscillator counts from a received time marker in a downstream transport stream that are incremented at the preset frequency from the local oscillator between time marker reception times from the downstream transport stream; and comparing means for comparing a time marker count currently received in a downstream TDMA transport stream from one of the at least one time marker insertion unit with a current modulo N count from the counter, and generating an error control output signal corresponding to a difference between [a] *the* currently received time marker count and a current count in the counter for transmission to the digitally controlled local oscillator for altering the preset frequency of the digitally controlled local oscillator in a predetermined direction.

10. A time division multiple access (TDMA) communication network comprising:

channel synchronizing means for synchronizing channels in a down stream directions towards users of the communication network comprising:

a timebase timer for generating time markers comprising modulo N-bit programming cyclical reference counts that are incremented at a predetermined frequency and are reset to 0 when the reference counts reach a predefined value; and a plurality of time marker insertion units, each time marker insertion unit comprising:

a first input terminal for receiving a digital TDMA transport stream having a predetermined data rate and comprising data packets and Media Access Control (MAC) packets that are interspersed between the data packets at predetermined intervals;

a second input terminal for receiving the time markers generated by the timebase timer and for inserting a currently received time marker count into a currently received MAC packet; and an output terminal for transmitting the received TDMA data stream with the inserted time marker counts in the MAC packets in a continuous TDMA output transport stream to remote user terminals, where the time markers are independent of a data rate, a physical channel, and a channel protocol of the TDMA output transport stream and are used for synchronizing the user terminals, where two of the time marker insertion units receive digital TDMA transport streams having different predetermined data rates.

11. The TDMA communication network of claim 10 wherein the downstream channel synchronizing means further comprises a plurality of modulator means wherein two of the modulator means modulate the digital TDMA transport streams transmitted by separate ones of the plurality of time marker insertion units into separate analog downstream TDMA output transport streams having different predetermined protocols for transmission to the remote user terminals.

12. The TDMA communication network of claim 10 further comprising upstream channel synchronizing means which comprises a plurality of upstream channel units, each upstream channel unit comprising a programmable real time unit for (a) storing information related to a frame length and a number of time slots arbitrarily preassigned to each user terminal that is transmitting data packets in an upstream TDMA transport stream via the upstream channel unit, and (b) receiving both the upstream TDMA transport stream comprising data packets at a predetermined data rate from the remote user terminals and the time markers comprising the modulo N-bit programmable cyclical reference counts generated by the timebase timer for synchronizing the processing of the data packets in the upstream channel unit during their time of arrival at the upstream channel unit.

13. The TDMA communication network of claim 12 wherein each upstream channel unit in the upstream channel synchronizing means further comprising a burst demodulator for receiving both the upstream TDMA transport stream comprising data packets at a predetermined data rate from the remote user terminals, and an aperture control signal from the programmable real time unit for measuring data packet arrival times relative to the aperture control signal in the received upstream TDMA transport stream.

14. The TDMA communication network of claim 12 wherein at least two of the upstream channel units receive and process upstream TDMA transport streams comprising different transport stream protocols.

15. The TDMA communication network of claim 10 wherein the network further comprises:

a plurality of remote user terminals, each user terminal comprising a network interface module for performing network timing functions comprising synchronizing means comprising:

a digitally controlled local oscillator for generating modulo N-bit programmable cyclical local oscillator counts that are incremented at a predetermined frequency; and a counter for generating modulo N-bit programmable cyclical local oscillator counts from a received time marker in a downstream transport stream that are incremented at the [preset] *predetermined* frequency from the local oscillator between time marker reception times from the downstream transport stream; and comparing means for comparing a time marker count currently received in a downstream TDMA transport stream from one of the at least one time marker insertion unit with a central modulo N count from the counter, and generating an error control output signal corresponding to a difference between a currently received time marker count and a current count in the counter for transmission to the digitally controlled local oscillator for altering the [preset] *predetermined* frequency of the digitally controlled local oscillator in a predetermined direction.

16. A method of synchronizing communication between central office equipment and a plurality of remote user terminals in a TDMA communication network comprising the steps of:

(a) generating a time marker sequence comprising modulo N-bit programmable cyclical reference counts that are incremented at a predetermined frequency in a timebase timer and are reset to 0 when the counter reaches a predefined value;

(b) receiving at least one digital time division multiple access (TDMA) transport stream, each digital TDMA transport stream comprising a predetermined frequency including data packets and Media Access Control (MAC) packets that are interspersed between the data packets at predetermined intervals;

(c) inserting a currently received time marker count generated in step (a) into a MAC packet that is concurrently received in step (b) in each of the at least one digital TDMA transport streams in a time marker insertion unit; and (d) transmitting each digital TDMA transport stream with the inserted time marker counts in the MAC packets from step (c) in a separate continuous analog downstream TDMA transport stream to remote user terminals, where the timer markers in each of the analog downstream TDMA output transport streams are independent of a data rate, a physical channel, and a channel protocol of the downstream TDMA output transport stream and are used by the plurality of user terminals for synchronizing their upstream data transmissions.

17. The method of claim 16 comprising the further step of:

(e) modulating each of the at least one digital TDMA transport stream transmitted by the time marker insertion unit into a separate analog downstream TDMA output transport stream having a predetermined protocol for transmission to the plurality of remote user terminals.

18. The method of claim 16 comprising the further steps of:

(e) storing separate control information related to a frame length and a number of time slots arbitrarily preassigned to predetermined user terminals in a programmable real time unit of an upstream channel unit that is assigned to receive data packets from the predetermined user terminals is an upstream direction in an upstream TDMA transport stream; and (f) receiving both the time markers comprising the modulo N-bit programmable cyclical reference counts generated by the timebase timer in step (a) and the upstream TDMA transport stream comprising data packets at a predetermined data rate from the predetermined remote user terminals for synchronizing the processing the data packets from the predetermined user terminals in the upstream channel unit during their time of arrival at the upstream channel unit.

19. The method of claim 18 wherein in performing step (f) receiving both the upstream TDMA transport stream comprising data packets at a predetermined data rate from the predetermined remote user terminals and an aperture control signal from the programmable real time unit for measuring data packet arrival times relative to the aperture control signal in the received TDMA transport stream.

20. The method of claim 19 wherein the TDMA communication system comprises a plurality of upstream channel units, and in performing step (f), at least two of the upstream channel units receive and process separate upstream TDMA transport streams comprising different transport stream protocols.

21. The method of claim 16 wherein each of the plurality of remote user terminals comprises a network interface module for performing the steps of:

(e) generating clock pulses at a preset frequency in a digitally controlled local oscillator;

(f) generating modulo N-bit programmable cyclical local oscillator counts from a received time marker in a downstream transport stream in a counter that are incremented at the preset frequency from the local oscillator between time marker reception times from the downstream transport stream; and (g) comparing a time marker count currently received in a downstream TDMA transport stream with a current modulo N count from the counter in a comparing device, and generating an error control output signal corresponding to a difference between a currently received time marker count and a current count in the counter for transmitting to the digitally controlled local oscillator for altering the preset frequency of the digitally controlled local oscillator in a predetermined direction; and (h) altering the predetermined frequency of the digitally controlled local oscillator in a predetermined direction in response to the error control output signal generated in step (g).

*22. Central office equipment for a time division multiple access (TDMA) communication network for supporting upstream and downstream communications including:*

*means for generating time markers which are independent of a data rate, a physical channel, and a channel protocol of a data transport stream; and*

*a time marker insertion unit including a first input for receiving a channel specific data transport stream, a second input for receiving generated time markers, and an output for outputting the channel specific data transport stream with inserted time markers for downstream communication wherein a time base timer generates said time markers as modulo N-bit programmable cyclical reference counts that are incremented at a predetermined frequency and are reset to zero (0) when the reference counts reach a predefined value.*

*23. Central office equipment according to claim 22 wherein said first input receives a digital TDMA transport stream having a predetermined data rate, said transport stream including data packets and Media Access Control (MAC) packets that are interspersed between the data packets at predetermined intervals, and said time marker insertion unit inserts time markers into Media Access Control (MAC) packets and outputs the TDMA data stream with the inserted time marker counts in the MAC packets.*

*24. Central office equipment for a time division multiple access (TDMA) communication network for supporting upstream and downstream communications including:*

*means for generating time markers which are independent of a data rate, a physical channel, and a channel protocol of a data transport stream; and*

*a time marker insertion unit including a first input for receiving a channel specific data transport stream, and a second input for receiving generated time markers, and an output for outputting the channel specific data transport stream with inserted time markers for downstream communication; and*

*at least one upstream channel unit having a programmable real time unit for (a) storing information related to a frame length and a number of time slots arbitrarily preassigned to an upstream channel, (b) receiving an upstream TDMA transports stream of data packets at a predetermined data rate from a remote user terminal, and (c) using said generated time markers to generate an aperture control signal for synchronizing the processing of the data packets in the upstream channel unit.*

*25. Central office equipment according to claim 24 wherein said upstream channel unit further includes a burst demodulator for receiving both the upstream TDMA transport stream of data packets at a predetermined data rate and the aperture control signal from the programmable real time unit for measuring burst arrival times relative to the aperture control signal in the received upstream TDMA transport stream.*

*26. Central office equipment for a time division multiple access (TDMA) communication network for supporting upstream and downstream communications including:*

*means for generating time markers which are independent of a data rate, a physical channel, and a channel protocol of a data transport stream; and*

*a time marker insertion unit including a first input for receiving a channel specific data transport stream, a second input for receiving generated time markers, and an output for outputting the channel specific data transport stream with inserted time markers for downstream communication; and*

*a plurality of upstream channel units each having means for synchronizing an upstream channel using said generated time markers, and at least two of the upstream channel units receive and process upstream TDMA transport steams having different transport data stream protocols.*

*27. Central office equipment for a time division multiple access (TDMA) communication network for supporting upstream and downstream communications including:*

*means for generating time markers which are independent of a data rate, a physical channel, and a channel protocol of a data transport stream; and*

*a time marker insertion unit including a first input for receiving a channel specific data transport stream, a second input for receiving generated time markers, and an output for outputting the channel specific data transport stream with inserted time markers for downstream communication; and*

*a plurality of time marker insertion units, each insertion unit including a first input for receiving a channel specific data transport stream of a channel different than the others of the plurality of time marker insertion units, a second input for receiving generated time markers, and an output for outputting the channel specific data transport stream with inserted time markers for downstream communication.*

*28. Central office equipment according to claim 27 wherein a time base timer generates said time markers as modulo N-bit programmable cyclical reference counts that are incremented at a predetermined frequency and are reset to zero (0) when the reference counts reach a predefined value.*

*29. Central office equipment according to claim 28 wherein said first input of each insertion unit receives a*

*digital TDMA transport stream having a predetermined data rate, said transport stream including data packets and Media Access Control (MAC) packets that are interspersed between the data packets at predetermined intervals, and said time marker insertion units insert time markers into Media Access Control (MAC) packets and output the TDMA data stream with the inserted time marker counts in the MAC packets.*

*30. Central office equipment according to claim 29 further including:*

*a plurality of modulator means each for modulating the output of one of said insertion units to produce analog output TDMA transport streams for transmission to remote user terminals, and*

*at least two of the modulator means modulate the digital TDMA transport streams to produce analog output TDMA transport streams having different predetermined protocols for transmission to remote user terminals.*

*31. Central office equipment according to claim 27 further including at least one upstream channel unit having a programmable real time unit for (a) storing information related to a frame length and a number of time slots arbitrarily preassigned to an upstream channel, (b) receiving an upstream TDMA transport stream of data packets at a predetermined data rate from a remote user terminal, and (c) using said generated time markers to generate an aperture control signal for synchronizing the processing of the data packets in the upstream channel unit.*

*32. Central office equipment according to claim 31 wherein said upstream channel unit further includes a burst demodulator for receiving both the upstream TDMA transport stream of data packets at a predetermined data rate and the aperture control signal from the programmable real time unit for measuring burst arrival times relative to the aperture control signal in the received upstream TDMA transport stream.*

*33. Central office equipment according to claim 27 including a plurality of upstream channel units each having means for synchronizing an upstream channel using said generated time markers, and at least two of the upstream channel units receive and process upstream TDMA transport streams having different transport data stream protocols.*

*34. A remote user terminal for TDMA communication network for supporting upstream and downstream communications from central office equipment including:*

*time marker detector means for detecting time markers in a received data stream and outputting a signal responsive to detected time markers;*

*variably controllable oscillator means for controlling the timing sequence of the processing of the received data stream; and*

*said variably controllable oscillator means operatively associated with said time marker detector means for varying the timing in response to detected time markers wherein:*

*said variable controllable oscillator means includes a digitally controlled local oscillator for generating clock pulses;*

*a counter is provided for generating modulo N-bit programmable cyclical local oscillator counts by incrementing a received time marker count at the frequency from the local oscillator between time marker reception times; and*

*comparing means are provided for comparing a received time marker count with a previously received time marker count which has been incremented by the counter, and generating an error control output signal corresponding to a difference between the received time marker count and the incremented count for adjusting the frequency of said digitally controlled local oscillator.*

* * * * *

UNITED STATES PATENT AND TRADEMARK OFFICE

CERTIFICATE OF CORRECTION

PATENT NO. : RE 38,619 E
DATED : October 12, 2004
INVENTOR(S) : Paratore et al.

It is certified that error appears in the above-identified patent and that said Letters Patent is hereby corrected as shown below:

Column 13,
Line 17, after the word "marker", delete "inserting", and insert therefor -- insertion --.
Line 20, after the word "are", delete "interposed", and insert therefor -- interspersed --.
Line 29, after the word "transport", delete "streams", and insert therefor -- stream --.

Column 14,
Line 43, after the word "stream", delete "directions", and insert therefor -- direction --.

Column 16,
Line 29, after the first instance of the word "the", delete "timer", and insert therefor -- time --.

Column 18,
Line 7, after the word "TDMA", delete "transports", and insert therefor -- transport --.

Signed and Sealed this

First Day of March, 2005

JON W. DUDAS
*Director of the United States Patent and Trademark Office*